United States Patent [19]

Asanuma et al.

[11] Patent Number: 5,326,824
[45] Date of Patent: Jul. 5, 1994

[54] SYNDIOTACTIC PROPYLENE COPOLYMER, METHOD FOR PREPARING SAME, AND ITS USE

[75] Inventors: Tadashi Asanuma; Kazuhiko Yamamoto, both of Takaishi, Japan

[73] Assignee: Mitsui Toatsu Chemicals, Incorporated, Tokyo, Japan

[21] Appl. No.: 699,632

[22] Filed: May 14, 1991

[30] Foreign Application Priority Data

| May 18, 1990 | [JP] | Japan | 2-126914 |
| May 21, 1990 | [JP] | Japan | 2-129021 |
| Jul. 18, 1990 | [JP] | Japan | 2-187881 |
| Jul. 20, 1990 | [JP] | Japan | 2-190724 |
| Jul. 24, 1990 | [JP] | Japan | 2-193905 |
| Sep. 19, 1990 | [JP] | Japan | 2-247160 |
| Mar. 18, 1991 | [JP] | Japan | 3-052652 |

[51] Int. Cl.$^5$ .................. C08F 255/02; C08F 255/04
[52] U.S. Cl. .................................... 525/288; 525/285; 525/301; 525/309; 525/317; 525/322
[58] Field of Search ............... 525/263, 285, 301, 308, 525/309, 322, 288, 317

[56] References Cited

U.S. PATENT DOCUMENTS 3,414,551 12/1968 Reid et al. .
3,652,730 3/1972 Faire et al. .
4,892,851 1/1990 Ewen et al. .
5,124,404 6/1992 Atwell et al. .................. 525/72

FOREIGN PATENT DOCUMENTS 0395055 10/1990 European Pat. Off. .

Primary Examiner—Vasu S. Jagannathan
Attorney, Agent, or Firm—Burns, Doane, Swecker & Mathis

[57] ABSTRACT

A syndiotactic graft copolymer is here disclosed in which a radical polymerizable unsaturated compound is grafted on a propylene homopolymer or copolymer, and this graft copolymer is obtained by heating a homopolymer having a substantially syndiotactic structure of propylene or a copolymer having a substantially syndiotactic structure of propylene and another $\alpha$-olefin and a radical polymerizable unsaturated compound such as an unsaturated carboxylic acid or an unsaturated silane in the presence of a radical initiator up to the decomposition temperature or more of the radical initiator. This kind of graft copolymer can be used as a composition for adhesion. The graft copolymer in which the radical polymerizable unsaturated compound is a hydrolyzable unsaturated silane can be converted into a crosslinked polymer by heating in the presence of water, and it can also be converted into a water-crosslinkable resin composition by adding various additive thereto.

13 Claims, 3 Drawing Sheets

SYNDIOTACTIC PROPYLENE COPOLYMER, METHOD FOR PREPARING SAME, AND ITS USE

BACKGROUND OF THE INVENTION (a) Field of the Invention

The present invention relates to a copolymer having a substantially syndiotactic structure of propylene, a method for preparing it, and its use. More specifically, the present invention relates to a copolymer of propylene which is prepared by graft polymerizing a radical polymerizable unsaturated compound on a syndiotactic propylene homopolymer having a relatively high tacticity or a syndiotactic copolymer having a relatively high tacticity of propylene and a small amount of another olefin, a method for preparing the above-mentioned copolymer, and its use.

(b) Description of the Prior Art

An isotactic polypropylene is inexpensive and relatively excellent in the balance of physical properties, and thus it is utilized in various uses. On the other hand, a syndiotactic polypropylene has been known for a long period of time. However, such a syndiotactic polypropylene is prepared by polymerization at a low temperature in the presence of a conventional catalyst comprising a vanadium compound, an ether and organic aluminum, and the syndiotactic polypropylene prepared by this process is poor in syndiotacticity and has elastomer-like characteristics. Therefore, it is scarcely considered that the thus prepared syndiotactic polypropylene exerts its inherent characteristics.

On the contrary, a polypropylene having good tacticity, i.e., a syndiotactic pentad fraction of more than 0.7 has been discovered for the first time by J. A. Ewen et al. which can be obtained by the use of a catalyst comprising a transition metal compound having asymmetric ligands and an aluminoxane (J. Am. Chem. Soc., Vol. 110, 6255–6256, 1988).

A syndiotactic polypropylene or a copolymer having a substantially syndiotactic structure of propylene and another olefin which is obtained by the above-mentioned method is relatively excellent in physical properties, but this kind of polypropylene or copolymer has a bad affinity for a polymer containing another polar group or a metal, i.e., it is poor in adhesive properties similarly to the isotactic polypropylene.

On the other hand, a polymer prepared by graft polymerizing a monomer containing a carboxyl group such as maleic anhydride on the isotactic polypropylene is utilized for the purpose of improving adhesive properties to another polyolefin or coating properties. However, this technique has problems that the radical decomposition of the polypropylene which is the base polymer occurs in a manufacturing step, with the result that the molecular weight of the resultant copolymer noticeably decreases, and that when manufactured in a liquid phase, it is difficult to separate the copolymer. On the contrary, if a product containing a syndiotactic polypropylene as a base is prepared, physical properties which have not been heretofore present can be expected.

SUMMARY OF THE INVENTION

An object of the present invention is to provide a novel propylene copolymer having a substantially syndiotactic structure and a method for preparing the same.

Another object of the present invention is to provide a resin composition for adhesion containing this propylene copolymer.

Still another object of the present invention is to provide a water-crosslinkable resin composition containing a novel water-crosslinkable propylene copolymer having a substantially syndiotactic structure.

A further object of the present invention is to provide a method for preparing a crosslinked polypropylene from a polypropylene having a substantially syndiotactic structure and a hydrolyzable unsaturated silane.

Other objects of the present invention will be apparent from the undermentioned description.

The propylene copolymer having a substantially syndiotactic structure of the present invention is a graft copolymer which can be obtained by heating a homopolymer having a substantially syndiotactic structure of propylene or a copolymer having a substantially syndiotactic structure of propylene and another $\alpha$-olefin and a radical polymerizable unsaturated compound in the presence of a radical initiator up to the decomposition temperature or more of the radical initiator, and in this graft copolymer, the content of grafted unsaturated compound units is from 0.1 to 50% by weight of the propylene homopolymer or copolymer.

A method for preparing the above-mentioned propylene copolymer is characterized by heating a homopolymer having a substantially syndiotactic structure of propylene or a copolymer of propylene and another $\alpha$-olefin and a radical polymerizable unsaturated compound in the presence of a radical initiator up to the decomposition temperature or more of the radical initiator.

A resin composition for adhesion of the present invention contains the above-mentioned propylene graft copolymer.

A water-crosslinkable polypropylene resin composition of the present invention is composed of a graft copolymer having a substantially syndiotactic structure, a phenolic antioxidant, a sulfide hydroperoxide decomposer and a polyvalent amine, said graft copolymer can be obtained by heating a homopolymer having a substantially syndiotactic structure of propylene or a copolymer having a substantially syndiotactic structure of propylene and another $\alpha$-olefin and a hydrolyzable unsaturated silane in the presence of a radical initiator up to the decomposition temperature or more of the radical initiator, and the content of grafted unsaturated silane units is from 0.1 to 50% by weight of the propylene polymer or copolymer.

Furthermore, a method for preparing the crosslinked propylene homopolymer or copolymer of the present invention is characterized by heating, in the presence of water, a graft copolymer obtained by heating a homopolymer having a substantially syndiotactic structure of propylene or a copolymer having a substantially syndiotactic structure of propylene and another $\alpha$-olefin and a hydrolyzable unsaturated silane in the presence of a radical initiator up to the decomposition temperature or more of the radical initiator.

DESCRIPTION OF THE PREFERRED EMBODIMENTS

Figure 1:
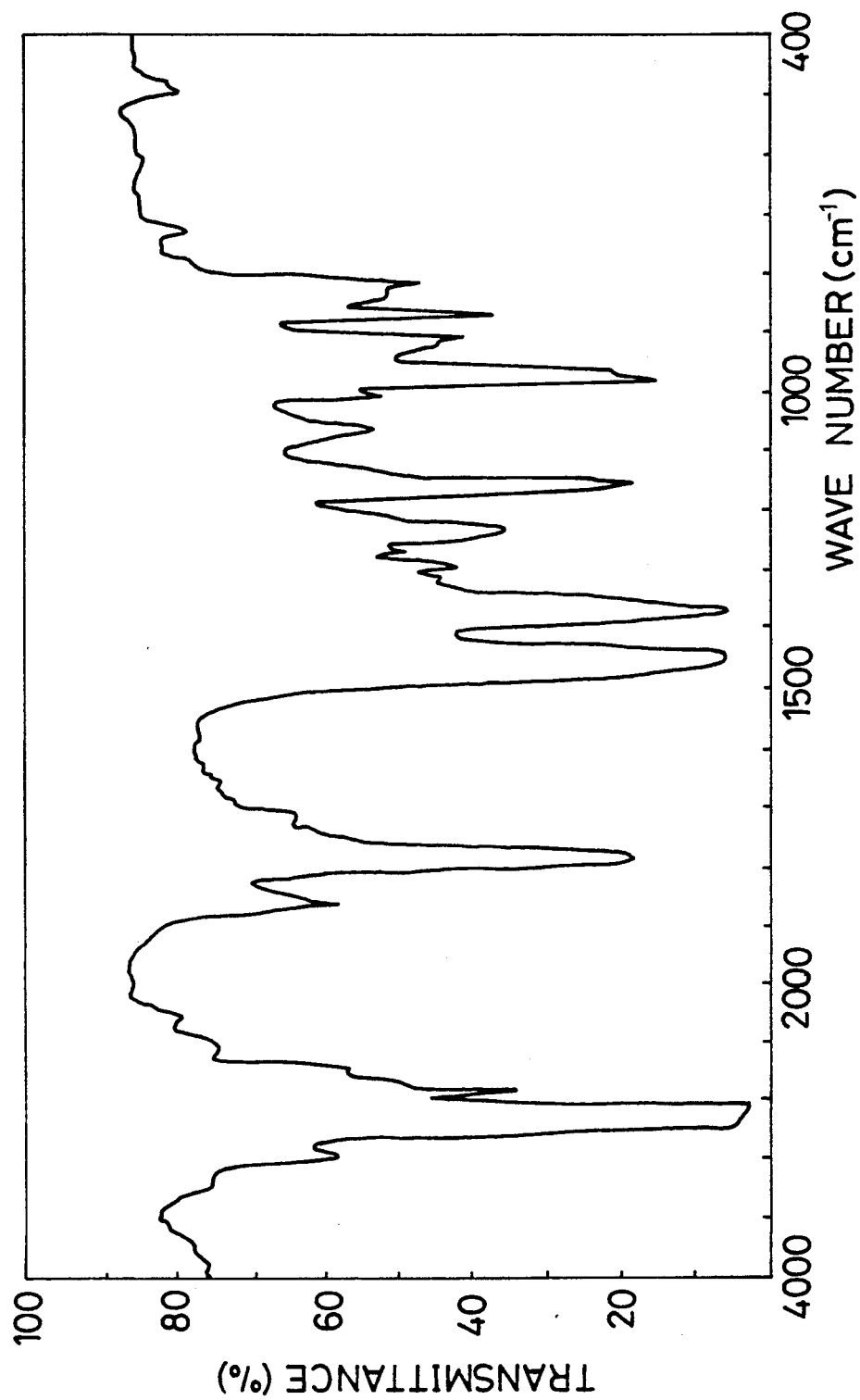
FIG. 1 is an infrared absorption spectrum of a graft copolymer obtained in Example 1.

In the present invention, a homopolymer having a substantially syndiotactic structure of propylene or a copolymer having a substantially syndiotactic structure of propylene and a small amount of another α-olefin can be used as a base polymer on which a radical polymerizable unsaturated compound will be grafted. The intrinsic viscosity of this homopolymer or copolymer measured in a tetralin solution at 135° C. is preferably from 0.01 to 5 dl/g.

As the above-mentioned propylene homopolymer, a crystalline polypropylene can be used which has such a highly syndiotactic structure that in the $^{13}$C-NMR spectrum of the polypropylene measured at 135° C. in 1,2,4-trichlorobenzene, a peak intensity of methyl groups attributed to a syndiotactic pentad structure at about 20.2 ppm on the basis of tetramethylsilane is 0.5 or more, preferably 0.7 or more of the total peak intensity of all the methyl groups of propylene, and in the above-mentioned crystalline polypropylene, a portion which is soluble in toluene at room temperature is 10% by weight or less.

In the above-mentioned copolymer having a syndiotactic structure of propylene and another α-olefin, the amount of the α-olefin is preferably from 0.1 to 20% by weight, more preferably 0.1 to 10% by weight. When the amount of the α-olefin is in excess of 20% by weight, molded articles of the obtained copolymer deteriorate in stiffness. Examples of the α-olefin include ethylene and α-olefins having 4 to 20 carbon atoms which may be branched, and typical examples thereof include straight-chain olefins such as butene-1, pentene-1, hexene-1, heptene-1, octene-1, nonene-1, decene-1, undecene-1, dodecene-1, tridecene-1, pentadecene-1, hexadecene-1, heptadecene-1 and octadecene-1 as well as branched olefins such as 3-methylbutene-1, 4-methylpentene-1 and 4,4-dimethylpentene-1.

The above-mentioned copolymer preferably has such a highly syndiotactic structure that in the $^{13}$C-NMR. spectrum of the copolymer measured in the same manner as in the case of the propylene homopolymer, a peak intensity attributed to a syndiotactic structure at about 20.2 ppm is preferably 0.3 or more, more preferably 0.5 or more of the peak intensity attributed to all the methyl groups of propylene.

The above-mentioned propylene homopolymer or copolymer can be obtained by (co)polymerizing propylene alone or propylene and a small amount of another α-olefin in the presence of a catalyst. As the catalyst, there is used a catalyst by which a polypropylene having a syndiotactic pentad fraction of 0.7 or more can be produced, when propylene alone is polymerized. The preferably usable catalyst is a combination of a transition metal compound represented by the formula

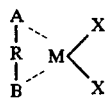

(wherein A and B are mutually different cyclic unsaturated hydrocarbon residues, R is a hydrocarbon residue having 1 to 20 carbon atoms or a group containing silicon or germanium which connects A with B, X is a halogen atom or a hydrocarbon residue having 1 to 20 carbon atoms, and M is a metal atom selected from the group consisting of titanium, zirconium and hafnium) and a co-catalyst.

Typical examples of the above-mentioned transition metal compound include isopropylidene(cyclopentadienylfluorenyl)zirconium dichloride and isopropylidene(cyclopentadienylfluorenyl)hafnium dichloride mentioned in the above J. A. Ewen et al. literature, and methylphenylmethylene(cyclopentadienylfluorenyl)zirconium dichloride, methylphenylmethylene(cyclopentadienylfluorenyl) hafnium dichloride, diphenylmethylene(cyclopentadienylfluorenyl)zirconium dichloride and diphenylmethylene(cyclopentadienylfluorenyl)hafnium dichloride mentioned in EP 387690 and EP 387691.

As the co-catalyst, an aluminoxane is preferably used, and ionic compounds mentioned in EP 277003 and EP 277004 may also be used.

Preferable examples of the aluminoxane include compounds represented by the formula

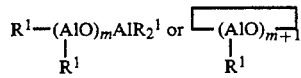

(wherein $R^1$ is a hydrocarbon residue having 1 to 3 carbon atoms, and m is an integer of from 1 to 50). In particular, what is suitably used is the aluminoxane in which $R^1$ is a methyl group and m is an integer of 5 or more.

For example, in case that the aluminoxane is used as the co-catalyst, the amount of the aluminoxane is from 10 to 100,000 mol times, usually from 50 to 10,000 mol times as much as that of the transition metal compound, and in case that the ionic compound is used as the co-catalyst, the amount of the ionic compound is from 0.1 to 100,000 mol times, usually from 0.5 to 5000 mol times as much as that of the transition metal compound.

No particular restriction is put on polymerization process and polymerization conditions, and any known technique for the polymerization of an α-olefin is utilizable such as solvent polymerization using an inert hydrocarbon medium, bulk polymerization in which there is substantially no inert hydrocarbon medium, or gas phase polymerization. Usually, the polymerization temperature is from −100° to 200° C. and the polymerization pressure is from atmospheric pressure to 100 kg/cm². Preferably, the temperature is from −50° to 100° C. and the pressure is from atmospheric pressure to 50 kg/cm².

Examples of the hydrocarbon medium used in the polymerization include saturated hydrocarbons such as butane, pentane, hexane, heptane, octane, nonane, decane, cyclopentane and cyclohexane as well as aromatic hydrocarbons such as benzene, toluene and xylene.

In order to further improve the syndiotacticity of the copolymer obtained by the above-mentioned copolymerization process, it is effective to use a catalyst containing a transition metal compound which has been purified to the level of a high purity (90% or more) and to carry out the polymerization at a low temperature of 100° C. or less, and it is also effective to wash the copolymer with a hydrocarbon solvent.

The hydrocarbon solvent is a compound having 3 to 20 carbon atoms, and its examples include propylene, saturated hydrocarbon compounds such as propane, butane, pentane, hexane, heptane, octane and nonane, aromatic hydrocarbon compounds such as benzene, toluene, xylene and ethyl benzene, and similar compounds in which a part or all of hydrogen atoms thereof are substituted by fluorine, chlorine, bromine or iodine. Examples of the other usable solvents include alcohols having 1 to 20 carbon atoms and ethers and esters having 2 to 20 carbon atoms which can dissolve or disperse a low-molecular atactic component therein. No particular restriction is put on a washing manner, but the washing is usually carried out at a temperature of from 0° C. to −100° C.

In the present invention, examples of the radical polymerizable unsaturated compound which can be used in the graft copolymerization include unsaturated carboxylic acids, esters of the unsaturated carboxylic acids, aromatic vinyl compounds, hydrolyzable unsaturated silane compounds and unsaturated halogenated hydrocarbons.

Examples of the unsaturated carboxylic acids include dicarboxylic anhydrides such as maleic anhydride, citraconic anhydride, 2-methylmaleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride as well as monocarboxylic acids such as acrylic acid and methacrylic acid.

Examples of the esters of the unsaturated carboxylic acids include methyl acrylate, ethyl acrylate, butyl acrylate, methyl methacrylate, ethyl methacrylate and butyl methacrylate.

The hydrolyzable unsaturated silane compound is a compound having a radical polymerizable unsaturated group and an alkoxysilyl group or a silyl group in its molecule, and its example is a compound having a hydrolyzable silyl group bonded to a vinyl group and, in a certain case, having a hydrolyzable silyl group bonded to the vinyl group via an alkylene group, or a compound having a hydrolyzable silyl group bonded to an ester or an amide of acrylic acid, methacrylic acid or the like. Typical examples thereof include vinyltrichlorosilane, vinyltris($\beta$-methoxyethoxy)silane, vinyltriethoxysilane, vinyltrimethoxysilane, $\gamma$-methacryloxypropyltrimethoxysilane, monovinylsilane and monoallylsilane.

Examples of the unsaturated halogenated hydrocarbon include vinyl chloride and vinylidene chloride.

Preferable examples of the radical initiator used in the graft copolymerization are known various organic peroxides which can usually be used in the graft polymerization on the polyolefin, and typical utilizable examples of the organic peroxides include benzoyl peroxide, methyl ethyl ketone peroxide, cyclohexanone peroxide, t-butylperoxyisopropyl carbonate, di-t-butyl perphthalate, 2,5-dimethyl-2,5-di(t-butylperoxy)hexene, 2,5-dimethyl-2,5-di(t-butylperoxy)hexene-3, di-t-butyl peroxide, cumene hydroperoxide, t-butyl hydroperoxide, dilauryl peroxide and dicumyl peroxide.

The graft copolymer of the present invention can be obtained by heating the above-mentioned propylene homopolymer or copolymer having a syndiotactic structure and the above-mentioned radical polymerizable unsaturated compound in the presence of a radical initiator at a temperature of the decomposition temperature or more of the radical initiator.

No particular restriction is put on the amount of the unsaturated compound to be used, and conventional conditions for an isotactic polypropylene can be utilized as they are. Since the efficiency of the copolymerization is relatively high, the amount of the unsaturated compound may be small. Usually, the amount of the unsaturated compound is preferably from 0.001 to 0.5 weight ratio with respect to the propylene homopolymer or copolymer having a syndiotactic structure.

The radical initiator is preferably used in a ratio of from 0.00001 to 0.1 weight ratio with respect to the unsaturated compound.

The heating temperature depends upon whether or not the reaction is carried out in the presence of a solvent, but it is usually from 50° to 350° C. When the heating temperature is less than 50° C., the reaction is slow and thus efficiency is low. When it is more than 350° C., a problem such as the decomposition of the polymer occurs. The reaction may be carried out using the propylene homopolymer or copolymer in the form of a solution or a slurry having a concentration of from 0.1 to 50% by weight in the presence of a halogenated hydrocarbon compound having 2 to 20 carbon atoms or a hydrocarbon compound having 6 to 20 carbon atoms which is stable to the radicals, or alternatively the reaction may be carried out in the absence of the solvent in a device such as an extruder which can sufficiently stir the highly viscous polymer. In the latter case, the reaction is usually effected at a relatively high temperature, as compared with the reaction in the state of the solution.

The obtained graft copolymer preferably contains a desired amount of radical polymerizable unsaturated compound units in the range of from 0.1 to 50% by weight of the propylene homopolymer or copolymer having a syndiotactic structure in compliance with its use application. When the content of the radical polymerizable unsaturated compound units is in excess of 50% by weight, the propylene homopolymer or copolymer having a syndiotactic structure does not exert its intrinsic physical properties, and when it is less than the above-mentioned lower limit, the physical properties as the graft copolymer cannot be obtained.

In the present invention, the graft polymerization can be carried out in an aqueous medium. In this case, a dispersant can be used, and examples of the dispersant include a saponified polyvinyl acetate, modified celluloses such as hydroxyethyl cellulose and hydroxypropyl cellulose, and compounds containing an OH group such as polyacrylic acid and polymethacrylic acid. In addition, compounds which are used in a usual aqueous suspension polymerization can also be widely employed.

The reaction is carried out by suspending the propylene homopolymer or copolymer having a syndiotactic structure, the water-insoluble radical polymerizable monomer, the water-insoluble radical initiator and the dispersant in water, and then heating the mixture. Here, a ratio of water to the sum of the radical polymerizable monomer and the propylene homopolymer or copolymer having a syndiotactic structure is preferably 1:0.1 to 1:200, more preferably 1:1 to 1:100. The heating temperature is such that the half-life of the radical initiator is preferably from 0.1 to 100 hours, more preferably from 0.2 to 10 hours, and it is preferably from 30° to 200° C., more preferably from 40° to 150° C. In the heating step, it is preferred that the mixture is stirred sufficiently so as to become a suspension state. In this way, the graft polymer can be obtained in the form of good granules.

A weight ratio of the water-insoluble monomer to the syndiotactic propylene homopolymer or copolymer is preferably from 1:0.1 to 1:10000, and a weight ratio of the radical initiator to the water-insoluble monomer is usually from 0.00001 to 0.1. The ratio of the water-insoluble monomer in the copolymer depends upon its use, but the amount of the monomer is usually from 0.1 to 200% by weight based on the propylene homopolymer or copolymer having a syndiotactic structure in the graft copolymer.

The graft copolymer of the present invention can be mixed with an α-olefin homopolymer or copolymer preferably ably containing no graft component, so that it can be used as a resin composition for adhesion. In this case, the above-mentioned unsaturated carboxylic acid, its derivative and a hydrolyzable silane can be preferably used as the radical polymerizable unsaturated compound which is grafted on the propylene homopolymer or copolymer having a syndiotactic structure.

As the above-mentioned α-olefin homopolymer or copolymer preferably containing no graft component, there can be used, if desired, α-olefin homopolymers having various molecular weight and random and block copolymers of α-olefins themselves. Examples of the α-olefin include ethylene and α-olefins having 4 to 20 carbon atoms in addition to propylene. The homopolymers and copolymers of these α-olefins can be manufactured by various known methods, and they are commercially available under various trade names on markets.

A mixing ratio between the graft copolymer and the homopolymer or copolymer of the α-olefin is such that the radical polymerizable unsaturated compound units, preferably the unsaturated carboxylic acid units or the hydrolyzable unsaturated silane compound units in the graft copolymer are present in an amount of 0.01 to 1% by weight in the obtained resin composition.

Various additives can be added to the above-mentioned composition, if necessary, and examples of the additives include an antioxidant, an ultraviolet absorber and the like which can be added to usual polyolefins.

Incidentally, it is not essential to add the homopolymer or copolymer of the α-olefin to the resin composition for adhesion of the present invention. The above-mentioned additive, e.g., a stabilizer alone can be added to the graft copolymer to obtain the resin composition for adhesion.

In the manufacturing process of the composition, no particular restriction is put on a mixing manner, and according to a usual procedure, the raw materials are mixed uniformly by means of a Henschel mixer or the like and then melted, mixed and molded into pellets by an extruder or the like. It is also possible to utilize a Brabender by which mixing and melting are carried out simultaneously, and after the melting, the material, needless to say, can be directly molded into films, sheets or the like.

Of the graft copolymers of the present invention, the copolymer in which the hydrolyzable unsaturated silane is grafted can be utilized as a starting material for the a crosslinked polypropylene or a crosslinked propylene copolymer. In this case, the hydrolyzable unsaturated silane units are present in the graft copolymer preferably in an amount of from 0.1 to 50% by weight, more preferably from 0.1 to 10% by weight based on the propylene homopolymer or copolymer having a syndiotactic structure.

The graft copolymer is heated in the presence of water. It is a usual procedure to mold the graft copolymer into a desired shape prior to this treatment. In order to effectively form the crosslinking with the aid of water during the molding step, a catalyst can be added. Examples of this kind of catalyst include hydroxides and oxides of alkaline metals and alkaline earth metals, ammonia, amines, organic and inorganic acids, salts thereof, alkoxysilicons and silicon hydride which are well known as catalysts for hydrolysis, and they can be directly used without any additional treatment. The amount of the catalyst is usually from 0.001 to 1% by weight of the graft copolymer.

Prior to the molding, a polymer which is compatible with the above-mentioned graft copolymer may be added thereto about 10 times by weight or less as much as the graft polymer.

A temperature at which the above-mentioned graft copolymer is heated in the presence of water is from 50° to 200° C., preferably from 80° to 120° C. Water may be used in the state of steam, but it is preferred that molded articles are immersed into boiling water.

In the thus crosslinked propylene homopolymer or copolymer having a syndiotactic structure, the ratio of the boiling xylene-insoluble component to this homopolymer or copolymer is preferably from 5 to 100% by weight.

Of the graft copolymers of the present invention, the copolymer on which the hydrolyzable unsaturated silane is grafted can be blended with a phenolic antioxidant, a sulfide hydroperoxide decomposer and a polyvalent amine to prepare a water-crosslinkable resin composition.

Many kinds of phenolic antioxidants are known and commercially available. A preferably utilizable example of the phenolic antioxidant is a substituted phenol such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butylphenol), 2,2'-methylene-bis(6-cyclohexyl-4-methylphenol), 1,6-hexanediol-bis([3-(3,5-di-t-butyl[4-hydroxyphenyl])] propionate and pentaerythrityl-tetrakis-[3-(3,5-di-t-butyl-4-hydroxyphenyl)] propionate.

A preferable example of the sulfide hydroperoxide decomposer is an ester of a thioether, and typical examples of the commercially available sulfide hydroperoxide decomposer include diesters of 3,3'-thiodipropionic acid and higher alcohols such as lauryl alcohol, tridecyl alcohol and stearyl alcohol.

Examples of the polyvalent amine include melamine, its derivatives, a hydrazide compound such as oxalic acid-bis(benzylidenehydrazide) and a triazole compound such as 3-(N-salicyloyl)amino-1,2,4-triazole.

The amount of each of these additives to be added is such that the weight ratio of the additive to the graft copolymer is preferably 1/1000 to 1/100000, more preferably 1/500 to 1/10000.

No particular restriction is put on the mixing manner of the graft copolymer and the stabilizer, and a usual manner can be used in which dry mixing is effected by means of a Henschel mixer, followed by melting and granulation.

To the above-mentioned composition, there can be added a neutralizing agent such as calcium stearate, magnesium hydroxide, aluminum hydroxide or hydrotalcite, and a nucleating agent such as a salt of benzoic acid, sodium-2,2'-methylene-bis(4,6-di-t-butylphenyl) phosphate and benzyl sorbitol, and the like, in addition to the above-mentioned stabilizer.

The above-mentioned composition is subjected to heat treatment in the presence of water to form crosslinking. Usually, the composition is molded into a desired shape prior to the heat treatment. In order to effectively form the crosslinking with the aid of water during the molding step, various catalysts can be added. Examples of the catalyst include hydroxides and oxides of alkaline metals and alkaline earth metals, ammonia, amines, organic and inorganic acids, salts thereof, and alkoxysilicons and silicon hydride which are well known as catalysts for hydrolysis, and they can be directly used without any additional treatment. The amount of the catalyst is usually from 0.001 to 1% by weight of the graft copolymer.

The present invention will be described in detail in reference to examples and comparative examples. However, the examples are quoted to describe the present invention, and they should not be understood to limit the present invention.

EXAMPLE 1

In a 200-liter autoclave were placed 0.2 g of isopropyl (cyclopentadienyl-1-fluorenyl)zirconium dichloride, 30 g of methylaluminoxane (polymerization degree 16.1) made by Toso Akzo Co., Ltd., 80 liters of toluene and propylene. This isopropyl (cyclopentadienyl-1-fluorenyl)zirconium dichloride was obtained by converting, into a lithium salt, isopropylcyclopentadienyl-1-fluorene synthesized in an ordinary manner, reacting the same with zirconium tetrachloride, and then recrystallizing the resultant reaction product. Afterward, propylene was polymerized at 20° C. under a polymerization pressure of 3 kg/cm$^2$-G for 2 hours. Methanol and methyl acetoacetate were added to the resultant polymer mixture, and the solution was treated at 30° C. and then washed with an aqueous hydrochloric acid solution. Next, the washed mixture was filtered to obtain 5.6 kg of a syndiotactic polypropylene. According to a $^{13}$C-NMR analysis, the syndiotactic pentad fraction of this polypropylene was 0.935, and an intrinsic viscosity (hereinafter referred to simply as "$\eta$") measured in a tetralin solution at 135° C. was 1.45. Furthermore, a ratio of the weight average molecular weight to the number average molecular weight of the polymer (hereinafter referred to simply as "Mw/Mn") measured in 1,2,4-trichlorobenzene was 2.2.

Afterward, 140 g of this polypropylene was dissolved in 1.4 liters of monochlorobenzene at 120° C. A solution of 20 g of maleic anhydride in 60 ml of monochlorobenzene and 40 ml of acetone, and 100 ml of monochlorobenzene containing 14 g of dicumyl peroxide were added to the resultant polypropylene solution over 4 hours under nitrogen atmosphere. After the addition, the solution was heated and stirred at 120° C. for 3 hours, and then cooled to 30° C. 1.5 liters of acetone was added, followed by filtration to easily separate a polymer powder. The thus obtained powder was further washed with 1.5 liters of acetone. The obtained powder was dried and weighed, and its amount was 142.5 g. According to an infrared absorption spectrum (FIG. 1), the content of the maleic anhydride in this powder was about 7.4% by weight. Furthermore, this powder was extracted with boiling acetone for 6 hours, and in this case, the content of the maleic anhydride similarly calculated was 6.8% by weight. In addition, according to $^{13}$C-NMR, the syndiotactic pentad fraction of propylene units was 0.928, which was not substantially changed, and $\eta$ was 1.28.

With regard to a pressed sheet (thickness 1 mm) of this graft copolymer, Izod impact strength (ASTM D256) was 14.5, which was not substantially changed, as compared with a value before the graft copolymerization.

COMPARATIVE EXAMPLE 1

The same procedure as in Example 1 was effected except that a commercially available isotactic polypropylene ($\eta$ was 1.62, isotactic pentad fraction measured by $^{13}$C-NMR was 0.954, and Mw/Mn was 6.7) was used as a polypropylene, so that a fine polymer powder was obtained. In consequence, it took 5 hours to perform filtration. The content of maleic anhydride in the powder was 3.1% by weight, and after extraction, it was 2.8% by weight. $\eta$ was 0.35, which meant that it deteriorated noticeably. Izod impact strength which was measured in the same manner as in Example 1 deteriorated to 2.1 from a value of 3.1 before graft copolymerization.

EXAMPLE 2

Polymerization was carried out at 60° C. by the use of the same catalyst as used in Example 1 in accordance with mass polymerization in which propylene itself is used as a solvent. The resultant syndiotactic polypropylene in which $\eta$ was 0.93 and syndiotactic pentad fraction was 0.83 was subjected to reaction by the same procedure as in Example 1 except that the amount of maleic anhydride was 30 g. Filtration could be easily achieved. The content of maleic anhydride in the resultant polymer was 10.5% by weight, and after extraction with boiling acetone, it was 8.9% by weight. $\eta$ was 0.72, which meant that it scarcely deteriorated.

EXAMPLE 3

To 2 parts of the graft copolymer obtained in Example 1 were added 98 parts by weight of a commercial copolymer (MFL$_{4.9}$ made by Mitsui Toatsu Chemicals, Inc.) of propylene and ethylene, 2,6-di-t-butyl-p-cresol (in a ratio of 10 to 10000 of the graft copolymer) and calcium stearate (in a ratio of 15 to 10000 of the graft copolymer), followed by granulation, thereby obtaining a resin composition for adhesion.

The thus obtained composition was extruded at 240° C. and Evarl (EP-F made by Kuraray Co., Ltd.) was extruded at 220° C. through co-extrusion T-dies of an extruder (Thermo Plastics Industry Co.) having L/D=22 and a diameter of 20 mm and a similar extruder, respectively, thereby obtaining a co-extruded sheet comprising the above-mentioned composition having a thickness of 0.12 mm and Evarl having a thickness of 0.13 mm. The peel strength (for a specimen having a width of 2.5 cm, T type peel strength was measured at 23° C. at a tensile rate of 100 mm/minute by the use of an Instron tensile testing machine) of this sheet was 32 g/cm.

COMPARATIVE EXAMPLE 2

The same procedure as in Example 3 was effected except that the graft copolymer obtained in Comparative Example 1 was used, thereby preparing a co-extruded sheet, and this sheet was then evaluated (in this case, 10 g of the graft copolymer was used so that the amount of maleic anhydride might be equal). The T type peel strength of the sheet was 14 g/cm.

EXAMPLE 4

The same procedure as in Example 3 was effected except that the graft copolymer obtained in Example 2 was used, thereby obtaining a random copolymer of propylene and ethylene. Next, a co-extruded sheet was prepared by the same procedure as in Example 3 except that the above-mentioned composition and a nylon (a 0.2-mm-thick film obtained from nylon 6 CM1021 made by Toray Industries, Inc.) were used and the extrusion temperature of the nylon was 260° C. For the thus co-extruded sheet, adhesive strength was evaluated, and as a result, peel strength was 720 g/cm.

EXAMPLE 5

Figure 2:
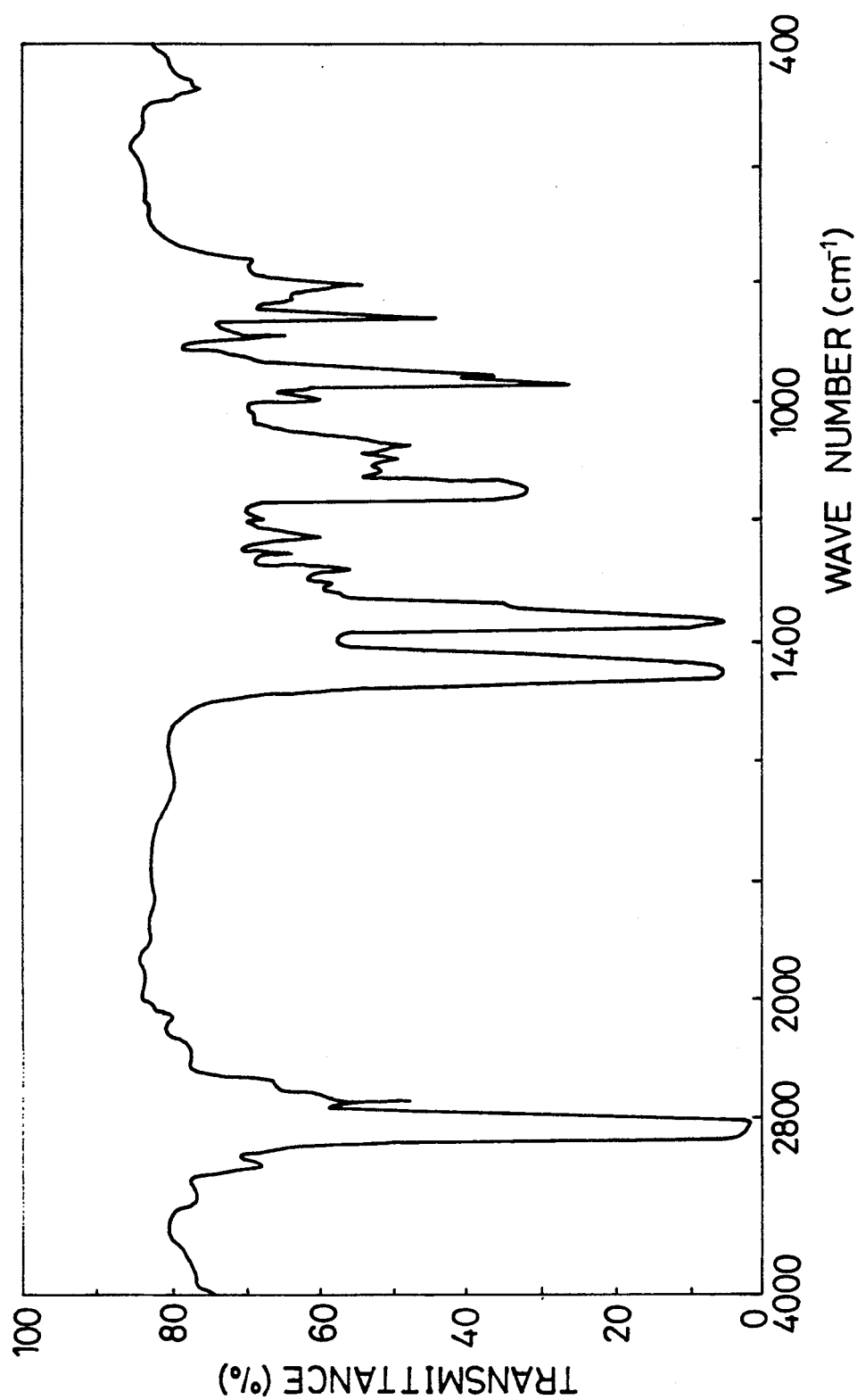
FIG. 2 is an infrared absorption spectrum of a graft copolymer obtained in Example 5.

0.5 kg of the syndiotactic polypropylene obtained in Example 1, 15 g of triethoxyvinylsilane and 10 ml of acetone containing 0.5 g of dicumyl peroxide were mixed, and the mixture was then melted and mixed at 230° C. in an extruder (made by Thermoplastics Industry Co., Ltd.) having a cylinder diameter of 20 mm to obtain a graft copolymer. The resultant pellets were dissolved in xylene and then added to a large amount of acetone to precipitate a polymer, and the unreacted triethoxyvinylsilane was then removed. According to the analysis of silicon, graft quantity was 1.8% by weight. The infrared absorption spectrum of this copolymer is shown in FIG. 2. Furthermore, according to $^{13}$C-NMR, the syndiotactic pentad fraction of propylene units was 0.928, which meant that it was not substantially changed, and $\eta$ was 1.32.

COMPARATIVE EXAMPLE 3

The same procedure as in Example 5 was effected except that the isotactic polypropylene used in Comparative Example 1 was employed, thereby obtaining a graft copolymer in which a small amount, 0.8% by weight, of trimethoxyvinylsilane was only contained. Furthermore, $\eta$ was also noticeably low, 0.45.

EXAMPLE 6

The same procedure as in Example 5 was effected except that the syndiotactic polypropylene obtained in Example 2 was used (in this case, triethoxyvinylsilane was replaced with 30 g of trimethoxyvinylsilane). The content of trimethoxyvinylsilane was 2.6% by weight, and $\eta$ was 0.74, which meant that it scarcely deteriorated.

EXAMPLE 7

0.15% by weight of dibutyltin laurate was added to the graft copolymer obtained in Example 5, and a sheet having a thickness of 1 mm was prepared and then treated for 10 hours with boiling water. When the sheet was extracted with xylene for 6 hours prior to the boiling water treatment, the ratio of the resultant residue was 0.52% by weight, but after the treatment with boiling water, it was 52.5% by weight, which meant that crosslinking proceeded. The tensile strength (ASTM D638) of the sheet improved from 240 kg/cm$^2$ before the crosslinking to 270 kg/cm$^2$.

COMPARATIVE EXAMPLE 4

The same procedure as in Comparative Example 3 was effected except that 40 g of trimethoxyvinylsilane was used, thereby obtaining a graft copolymer in which 2.1% by weight of trimethoxyvinylsilane was contained. When measurement was made in the same manner as in Example 7, the content of a boiling xylene-insoluble component in this copolymer was 28% by weight.

EXAMPLE 8

The same procedure as in Example 5 was effected except that the syndiotactic polypropylene obtained in Example 2 was used and triethoxyvinylsilane was replaced with 15 g of $\gamma$-methacryloxypropyltrimethoxysilane, thereby obtaining a graft copolymer. The content of $\gamma$-methacryloxypropyltrimethoxysilane was 1.40% by weight, and $\eta$ scarcely deteriorated and it was 0.74. Next, the same procedure as in Example 9 was done except that sodium oxide was used as a catalyst, and in this case, the amount of a residue after the extraction of the polymer with xylene was 25.3% by weight, which meant that crosslinking proceeded.

EXAMPLE 9

Hydrotalcite, 2,6-di-t-butyl-p-cresol, distearyl 3,3'-thiodipropionate and melamine were mixed with the graft copolymer obtained in Example 5 in weight ratios of 5/10000, 1/1000, 5/1000 and 1/1000 to the polymer, respectively. Next, 0.15% by weight of dibutyltin laurate was added, followed by granulation, and a 1-mm-thick sheet in which a 0.2-mm-thick copper plate was buried was formed and then treated with boiling water for 10 hours. When the sheet was extracted with boiling xylene for 6 hours prior to the boiling water treatment, the ratio of the resultant residue was 0.65% by weight, but after the treatment with boiling water, it was 82.5% by weight, which meant that crosslinking proceeded. This sheet was treated at 300° C. for 5 minutes, and the copper plate was then peeled off. The portion of the polymer which was brought into contact with the copper plate was observed, and it was confirmed that the contact portion was normal. In addition, the peeled copper plate was treated for 17 hours with water at 80° C., but any change was not observed.

COMPARATIVE EXAMPLE 5

The same procedure as in Example 9 was effected except that distearyl 3,3'-thiodipropionate was not used, and in this case, the amount of a residue after the extraction of the resultant polymer with boiling xylene was 81.6% by weight. However, after the resultant sheet was subjected to a heat treatment at 300° C., it was observed that the portion of the sheet which was brought into contact with a copper plate was colored light green, which meant that the polymer deteriorated.

COMPARATIVE EXAMPLE 6

The same procedure as in Example 9 was effected except that melamine was not used, and in this case, the amount of a residue after the extraction of the resultant sheet with boiling xylene was small, 48.5% by weight. After the sheet was subjected to a heat treatment at 300° C., it was confirmed that the portion of the sheet which was brought into contact with a copper plate was colored light green, which meant that the polymer deteriorated. In addition, a cloudy state was also observed on the copper plate.

COMPARATIVE EXAMPLE 7

The same procedure as in Example 9 was effected except that 2,6-di-t-butyl-p-cresol was not used, and in this case, the amount of a residue after the extraction of the resultant sheet with boiling xylene was small, 65.5% by weight. After the sheet was subjected to a heat treatment at 300° C., it was confirmed that the sheet was colored yellow all over, which meant that the polymer deteriorated.

EXAMPLE 10

The same procedure as in Example 9 was effected except that Iruganox H1010 (phenolic antioxidant), lauryl-stearyl 3,3'-thiodipropionate and melamine were mixed with the graft copolymer obtained in Example 8 in weight ratios of 1/1000, 3/1000 and 1/1000 to the copolymer, respectively, and in this case, the amount of a residue after the extraction of the resultant sheet with boiling xylene was 75.6% by weight. In addition, after a thermal treatment at 300° C., any change was not observed.

EXAMPLE 11

200 g of the syndiotactic polypropylene obtained in Example 1, 180 g of styrene, 0.96 g of saponified polyvinyl acetate made by Nippon Synthetic Chemical Industry Co., Ltd. (AH22, saponification degree 97.5 to 98.5%, polymerization degree 1500 or more) and 2 g of p-t-butyl peroxybenzoate were dispersed in 1 liter of water, and the dispersion was then heated at 90° C. for 4 hours with stirring. After completion of the reaction, the resultant slurry was filtered to obtain a polymer in the state of beads. After the polymer was sufficiently washed with acetone and then dried, the amount of the polymer was 370 g.

Figure 3:
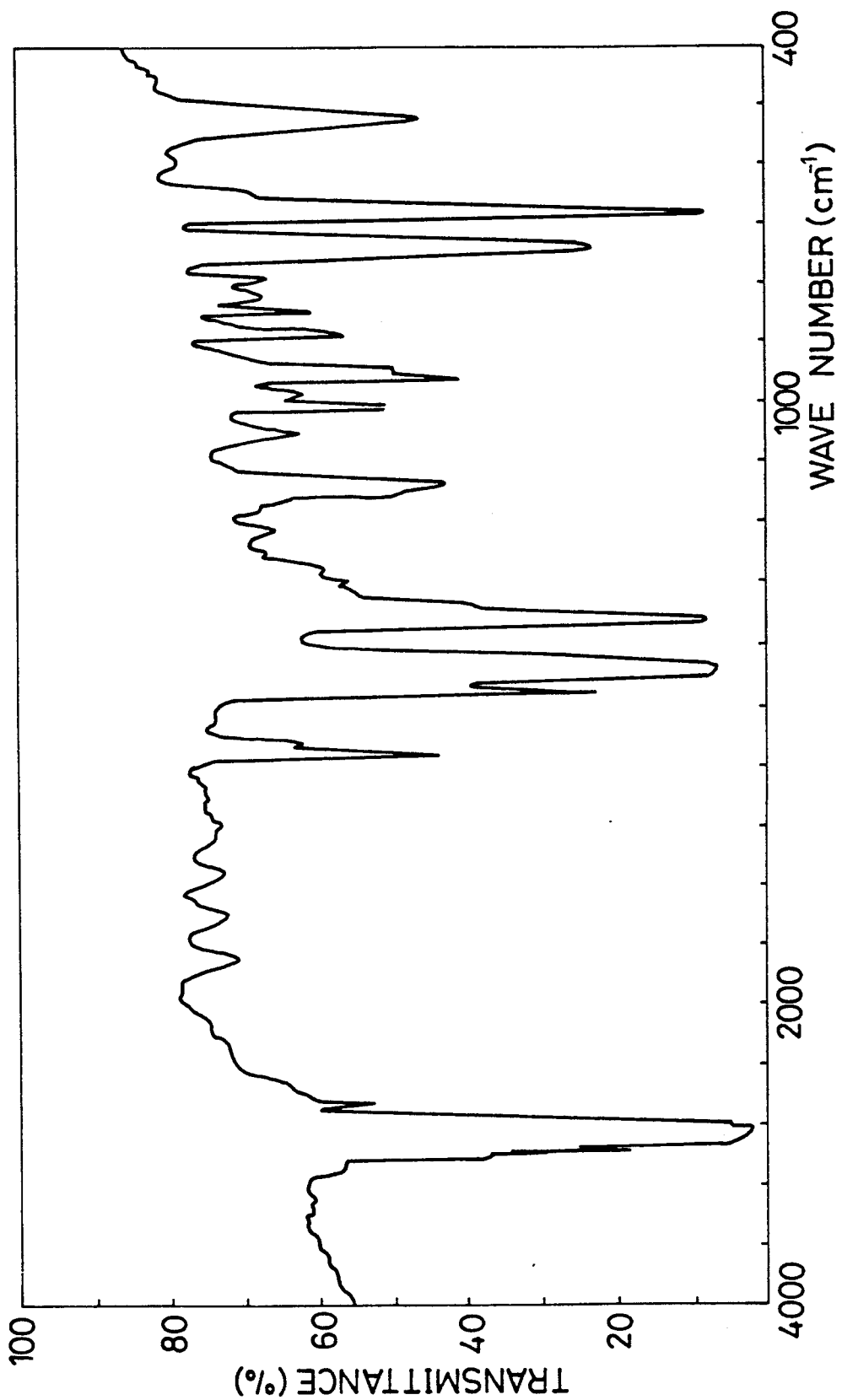
FIG. 3 is an infrared absorption spectrum of a graft copolymer obtained in Example 11.

The infrared absorption spectrum of this copolymer is shown in FIG. 3.

COMPARATIVE EXAMPLE 8

The same procedure as in Example 1 was effected except that the commercially available isotactic polypropylene used in Comparative Example 1 was used, and 345 g of an amorphous polymer was obtained.

EXAMPLE 12

Reaction was carried out by the same procedure as in Example 11 except that the syndiotactic polypropylene obtained in Example 2 was used, 100 g of styrene was used, an ethylhydroxy cellulose (Metolos 60SH50) made by The Shin-Etsu Chemical Co., Ltd. was used as a dispersant, and temperature was 100° C. In this case, 395 g of a polymer in the state of beads was obtained.

A graft copolymer, in which a radical polymerizable unsaturated compound is grafted on a propylene homopolymer or a copolymer of propylene and another α-olefin which has a substantially syndiotactic structure, is a useful polymer suitable for various uses. Furthermore, when the radical polymerizable unsaturated compound is grafted, the radical decomposition of the above-mentioned propylene homopolymer or copolymer does not occur substantially.

A copolymer prepared by grafting an unsaturated carboxylic acid on the above-mentioned propylene homopolymer or copolymer is useful as a resin composition for adhesion.

Furthermore, a copolymer prepared by grafting a hydrolyzable unsaturated silane on the above-mentioned propylene homopolymer or copolymer is useful as a resin composition for adhesion and can be used to prepare a crosslinkable resin composition.

What is claimed is:

1. A syndiotactic propylene graft copolymer which is obtained by heating a homopolymer having a substantially syndiotactic structure of propylene or a copolymer having a substantially syndiotactic structure of propylene and another α-olefin and a radical polymerizable unsaturated compound selected form the group consisting of an unsaturated carboxylic acid, a derivative of an unsaturated carboxylic acid, a hydrolyzable unsaturated silane, styrene, vinyl chloride and vinylidene chloride in the presence of a radical initiator up to the decomposition temperature or more of said radical initiator, the content of radical polymerizable unsaturated compound units grafted on said propylene homopolymer or copolymer being from b 0.1 to 50% by weight of said propylene homopolymer or copolymer.

2. The graft copolymer according to claim 1 wherein in the $^{13}$C-NMR spectrum of said propylene homopolymer measured in 1,2,4-trichlorobenzene on the basis of tetramethylsilane, a peak intensity of methyl groups attributed to a syndiotactic pentad structure at about 20.2 ppm is 0.5 or more of the total peak intensity of all the methyl groups of propylene.

3. The graft copolymer according to claim 1 wherein in the $^{13}$C-NMR spectrum of said copolymer of propylene and another α-olefin measured in 1,2,4-trichlorobenzene on the basis of tetramethylsilane, a peak intensity attributed to a syndiotactic pentad structure at about 20.2 ppm is 0.3 or more of the total peak intensity attributed to all the methyl groups of propylene.

4. A syndiotactic propylene graft copolymer which is obtained by heating a homopolymer having a substantially syndiotactic structure of propylene or a copolymer having a substantially syndiotactic structure of propylene and another α-olefin and a radical polymerizable unsaturated compound selected from the group consisting of an unsaturated carboyxlic acid, a derivative of an unsaturated carboxylic acid and a hydrolyzable unsaturated silane in the presence of a radical initiator up to the decomposition temperature or more of said radical initiator, the content of radical polymerizable unsaturated compound units grafted on said propylene homopolymer or copolymer being from 0.1 to 50% by weight of said propylene homopolymer or copolymer.

5. The graft copolymer according to claim 4 wherein in the $^{13}$C-NMR spectrum of said propylene homopolymer measured in 1,2,4-thichlorobenzene on the basis of tetramethylsilane, a peak intensity of methyl groups attributed to a syndiotactic pentad structure at about 20.2 ppm is 0.5 or more of the total peak intensity of all the methyl groups of propylene.

6. The graft copolymer according to claim 4 wherein in the $^{13}$C-NMR spectrum of said copolymer of propylene and another α-olefin measured in 1,2,4-trichlorobenzene on the basis of tetramethylsilane, a peak intensity attributed to a syndiotactic pentad structure at about 20.2 ppm is 0.3 or more of the total peak intensity attributed to all the methyl groups of propylene.

7. The graft copolymer according to claim 4 wherein said unsaturated carboxylic acid is selected from the group consisting of acrylic acid, methacrylic acid, maleic anhydride, citraconic anhydride, 2-methylmaleic anhydride, 2-chloromaleic anhydride, 2,3-dimethylmaleic anhydride, bicyclo-[2,2,1]-5-heptene-2,3-dicarboxylic anhydride and 4-methyl-4-cyclohexene-1,2-dicarboxylic anhydride.

8. The graft copolymer according to claim 4 wherein said derivative of an unsaturated carboxylic acid is selected from the group consisting of methyl acrylate, ethyl acrylate, butyl acrylate, methyl methacrylate, ethyl methacrylate and butyl methacrylate.

9. The graft copolymer according to claim 4 wherein said hydrolyzable unsaturated silane has a radical polymerizable unsaturated group and an alkoxysilyl or silyl group.

10. The graft copolymer according to claim 4 wherein said hydrolyzable unsaturated silane is selected from the group consisting of vinyltrichlorosilane, vinyltris($\beta$-methoxyethoxy)silane, vinyltriethoxysilane, vinyltrimethoxysilane, $\gamma$-methacryloxypropyltrimethoxysilane, monovinylsilane and monoallylsilane.

11. A syndiotactic propylene graft copolymer which is obtained by heating a homopolymer having a substantially syndiotactic structure of propylene or a copolymer having a substantially syndiotactic structure of propylene and another $\alpha$-olefin and a radical polymerizable unsaturated compound selected from the group consisting of styrene, vinyl chloride and vinylidene chloride in the presence of a radical initiator up to the decomposition temperature or more of said radical initiator, the content of radical polymerizable unsaturated compound units grafted on said propylene homopolymer or copolymer being from 0.1 to 50% by weight of said propylene homopolymer or copolymer.

12. The graft copolymer according to claim 11 wherein in the $^{13}$C-NMR spectrum of said propylene homopolymer measured in 1,2,4-trichlorobenzene on the basis of tetramethylsilane, a peak intensity of methyl groups attributed to a syndiotactic pentad structure at about 20.2 ppm is 0.5 or more of the total peak intensity of all the methyl groups of propylene.

13. The graft copolymer according to claim 11 wherein in the $^{13}$C-NMR spectrum of said copolymer of propylene and another $\alpha$-olefin measured in 1,2,4-trichlorobenzene on the basis of tetramethylsilane, a peak intensity attributed to a syndiotactic pentad structure at about 20.2 ppm is 0.3 or more of the total peak intensity attributed to all the methyl groups of propylene.

* * * * *

UNITED STATES PATENT AND TRADEMARK OFFICE
CERTIFICATE OF CORRECTION

PATENT NO. : 5,326,824

DATED : July 5, 1994

INVENTOR(S) : Asanuma et al.

It is certified that error appears in the above-identified patent and that said Letters Patent is hereby corrected as shown below:

Claim 1, column 14, line 4, "form" should be --from--;

Claim 1, column 14, line 12, "b" should be deleted.

Signed and Sealed this

Third Day of January, 1995

*Attest:*

BRUCE LEHMAN

*Attesting Officer*     *Commissioner of Patents and Trademarks*